US012600217B2

(12) United States Patent
Zawacki et al.

(10) Patent No.: US 12,600,217 B2
(45) Date of Patent: Apr. 14, 2026

(54) HEAVY-DUTY VEHICLE SUBFRAME WITH BATTERY STORAGE STRUCTURE

(71) Applicant: Hendrickson USA, L.L.C., Schaumburg, IL (US)

(72) Inventors: Jeff R. Zawacki, Channahon, IL (US); R. Scott Fulton, Hudson, OH (US); David M. Morar, Jr., Port Washington, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 332 days.

(21) Appl. No.: 18/129,205

(22) Filed: Mar. 31, 2023

(65) Prior Publication Data

US 2023/0311994 A1 Oct. 5, 2023

Related U.S. Application Data

(60) Provisional application No. 63/327,456, filed on Apr. 5, 2022.

(51) Int. Cl.
| | |
|---|---|
| *B60K 1/04* | (2019.01) |
| *B60R 16/04* | (2006.01) |
| *B62D 21/02* | (2006.01) |
| *B62D 21/11* | (2006.01) |

(52) U.S. Cl.
CPC ................. *B60K 1/04* (2013.01); *B60R 16/04* (2013.01); *B62D 21/02* (2013.01); *B62D 21/11* (2013.01)

(58) Field of Classification Search
CPC .......... B60K 1/04; B60R 16/04; B62D 21/02; B62D 21/11
See application file for complete search history.

(56) References Cited

U.S. PATENT DOCUMENTS

| | | | |
|---|---|---|---|
| 3,406,439 | A | 10/1968 | Hutchens |
| 4,993,737 | A | 2/1991 | Torcomian |
| 5,642,896 | A | 7/1997 | Pierce et al. |
| 5,720,489 | A | 2/1998 | Pierce et al. |
| 5,833,253 | A | 11/1998 | Hess et al. |
| 6,213,507 | B1 | 4/2001 | Ramsey et al. |
| 6,244,608 | B1 | 6/2001 | Hess |
| 6,260,645 | B1 | 7/2001 | Pawlowski et al. |
| 6,279,933 | B1 | 8/2001 | Ross et al. |
| 6,425,593 | B2 | 7/2002 | Fabris et al. |
| 6,859,989 | B2 | 3/2005 | Bauer et al. |
| 7,198,298 | B2 | 4/2007 | Ramsey |

(Continued)

FOREIGN PATENT DOCUMENTS

WO 2022036364 2/2022

OTHER PUBLICATIONS

Fruehauf Parts Catalog, pp. 176-179, published in the U.S. and believed to be publicly available prior to Mar. 29, 2007.

(Continued)

*Primary Examiner* — Brian L Swenson
(74) *Attorney, Agent, or Firm* — Dureska & Moore, LLC; David P. Dureska; Benjamin J. Chojnacki

(57) ABSTRACT

A subframe for heavy-duty vehicles, the subframe comprising a pair of elongated, longitudinal main members; at least one pair of hangers; and a battery storage structure integrated into the subframe. Each hanger of the at least one pair of hangers is attached to a respective one of the main members.

21 Claims, 14 Drawing Sheets

(56)         References Cited

U.S. PATENT DOCUMENTS

| | | | | |
|---|---|---|---|---|
| 7,303,200 | B2 | 12/2007 | Ramsey | |
| 7,549,660 | B2 | 6/2009 | Ramsey et al. | |
| 7,658,412 | B2 * | 2/2010 | Ramsey | B62D 33/00 |
| | | | | 280/784 |
| 11,325,453 | B2 * | 5/2022 | Friedman | H01M 50/249 |
| 12,005,958 | B2 * | 6/2024 | Grinstead | B62D 21/12 |
| 2005/0062251 | A1 | 3/2005 | Ramsey | |
| 2007/0001421 | A1 | 1/2007 | Pierce et al. | |
| 2007/0024017 | A1 | 2/2007 | Ramsey | |
| 2007/0216147 | A1 | 9/2007 | Ramsey | |
| 2007/0228686 | A1 | 10/2007 | Gerstenslager et al. | |
| 2008/0231034 | A1 | 9/2008 | Carr et al. | |
| 2020/0331536 | A1 * | 10/2020 | Sloan | B60L 50/66 |
| 2021/0188069 | A1 | 6/2021 | Friedman | |
| 2021/0387534 | A1 * | 12/2021 | Sjöholm | B62D 27/02 |
| 2024/0208315 | A1 * | 6/2024 | Grinstead | B60K 17/356 |
| 2024/0266663 | A1 * | 8/2024 | Futazuka | H01M 50/209 |

OTHER PUBLICATIONS

Hendrickson, L773—Vantraax Hkarl 46K Ramp-Ready Flyer Rev E 03-22.

* cited by examiner

HEAVY-DUTY VEHICLE SUBFRAME WITH BATTERY STORAGE STRUCTURE

CROSS-REFERENCE TO RELATED APPLICATION

This application claims the benefit of U.S. Provisional Patent Application No. 63/327,456, filed Apr. 5, 2022.

BACKGROUND

Technical Field

The invention relates generally to the art of frames and subframes for heavy-duty vehicles. In particular, the invention is directed to a subframe for a heavy-duty vehicle trailer. More particularly, the invention is directed to a moveable subframe for a heavy-duty vehicle trailer having a battery storage structure that provides a heavy-duty vehicle with lightweight, low-cost removeable battery storage and battery protection.

Background Art

The use of non-moveable and moveable subframes in heavy-duty vehicles is well-known. For the purpose of clarity and convenience, reference is made to a heavy-duty vehicle with the understanding that such reference includes trucks, tractor-trailers and semi-trailers, trailers, and the like.

Prior art moveable subframes, typically referred to as slider boxes, slider subframes, slider undercarriages, slider secondary frames, or bogies, generally utilize rigid main members and cross members typically made of steel. Reference is made generally to subframes with the understanding that such reference includes moveable subframes and non-moveable subframes. In some prior art subframes, cross members may be arranged in a parallel, spaced-apart manner perpendicular to the longitudinally extending main members. The rigid cross members and main members of prior art subframes react lateral or side loads. The cross members and main members also react longitudinal and vertical loads that the prior art subframe may experience. One or more K-shaped cross members have also been utilized in place of multiple cross members in order to reduce weight of the prior art subframe. Some prior art subframes have also utilized C- or G-shaped main members. The various shapes of the main members of prior art subframes provide for the incorporation of angled cross members that effectively react twisting or racking loads.

A pair of axle/suspension systems is typically suspended from and fixed to the prior art subframe to form a slider or slider tandem. Both mechanical spring suspension systems and air spring suspension systems have been utilized in prior art sliders. More specifically, prior art slider designs with air suspension systems provide both load equalization among multiple axles of the heavy-duty vehicle and improved ride quality for individual axles of the heavy-duty vehicle. As a result, prior art sliders with air suspension systems provide maximal versatility with respect to variable load distribution and load equalization for heavy-duty vehicles.

The amount of cargo that heavy-duty vehicles may carry is governed by local, state and/or national road and bridge laws, limiting the maximum load that a vehicle may carry, as well as the maximum load that can be supported by individual axles. Heavy-duty vehicles utilizing prior art sliders have an advantage with respect to laws governing maximum axle loads. More specifically, placement of the prior art slider redistributes the heavy-duty vehicle load and varies the individual axle loads such that it is within legal limits. Once properly positioned, the prior art slider is locked in position along the underside of the heavy-duty vehicle by a retractable pin mechanism, as is known.

Prior art subframes, including those utilized in prior art sliders, while generally performing adequately, may have certain disadvantages, drawbacks, and limitations. For example, certain types of heavy-duty vehicles utilizing prior art subframes, such as refrigerated trailers or reefers, may also utilize large, fuel-driven equipment, such as compressors, to provide a temperature-controlled environment within the heavy-duty vehicle trailer. Recent technological advances and increased regulation of engines used to run fuel-driven equipment, such as compressors, have made electrically-powered equipment more advantageous. However, electrically-powered equipment may require a source of electrical energy storage independent of the engine of the heavy-duty vehicle, such as a battery.

Typically, the type and/or format of batteries may be selected for particular characteristics, such as chemical composition or, in the case of lithium-ion batteries, high energy density. However, such batteries may potentially create a risk of combustion due to battery defects and/or puncture. Moreover, many such batteries are relatively heavy such that it is generally beneficial to mount them as low as possible in order to lower the center of gravity of the heavy-duty vehicle. Although, mounting some batteries in lower positions along the heavy-duty vehicle may potentially expose the batteries to damage from road debris, environmental elements, terrain, and/or collisions, thereby increasing the risk of combustion discussed above. As a result, sources of electrical energy storage, such as batteries, have typically been housed in large, independent, self-contained structures that may be attached to or adjacent portions of the exterior of the heavy-duty vehicle, such as the trailer. Attachment or placement of such self-contained battery storage structures to the exterior, or adjacent the exterior, of the heavy-duty vehicle generally requires the undesirable addition of structural support to reinforce the heavy-duty vehicle, thereby increasing the overall weight of the heavy-duty vehicle and decreasing cargo capacity. In addition, such self-contained battery storage structures may potentially increase the difficulty of load balancing when utilizing prior art subframes.

Thus, there is a need in the art for a subframe that includes a battery storage structure that is removeable and relatively lightweight to reduce the cost of materials and manufacturing, while providing battery protection and facilitating quick battery swapping.

BRIEF SUMMARY OF THE INVENTION

Objectives of the present invention include providing a subframe for heavy-duty vehicles having a battery storage structure that is relatively lightweight and removable.

A further objective of the present invention is to provide a subframe for heavy-duty vehicles having a battery storage structure that protects the batteries and facilitates swapping of the batteries.

These objectives and advantages are obtained by the subframe for heavy-duty vehicles, according to the present invention, the subframe comprising a pair of elongated, longitudinal main members; at least one pair of hangers; and a battery storage structure integrated into the subframe. Each of the at least one pair of hangers is attached to a respective one of the main members.

BRIEF DESCRIPTION OF THE SEVERAL VIEWS OF THE DRAWINGS

The preferred embodiments of the present invention, illustrative of the best mode in which applicants have contemplated applying the principles, is set forth in the following description, shown in the drawings, and particularly and distinctly pointed out and set forth in the appended claims.

Similar characters refer to similar parts throughout.

DESCRIPTION OF THE PREFERRED EMBODIMENT

Figure 1:
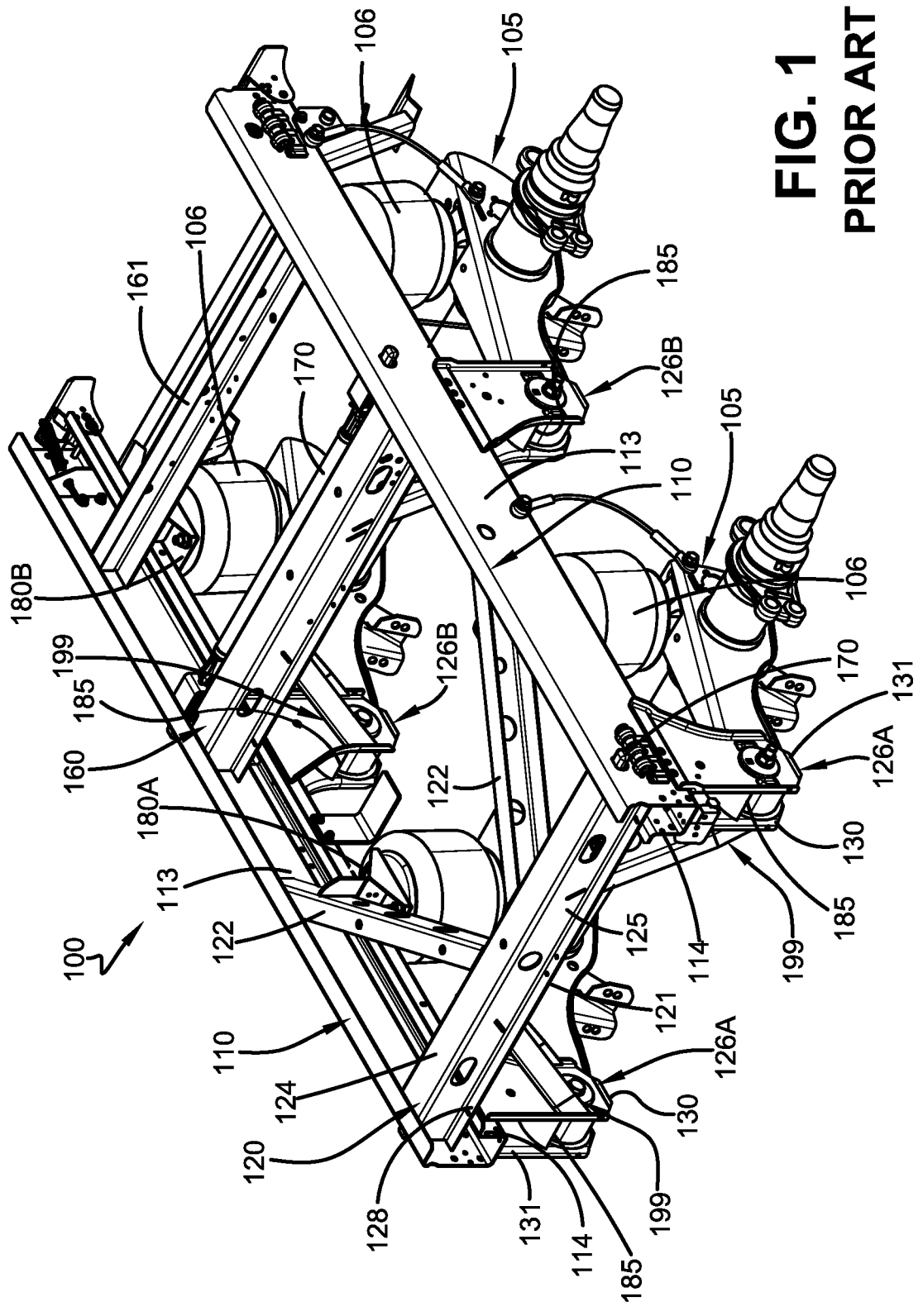
FIG. 1 is a top front perspective view of a prior art subframe utilized in conjunction with a pair of axle/suspension systems.

In order to better understand the environment in which the subframe of the present invention is utilized, a prior art subframe 100 is shown in FIG. 1 including a pair of main members 110, a front K-shaped cross member assembly 120, a rear cross member 160, a rear cross brace 161, and front and rear pairs of hangers 126A,126B, respectively.

Main members 110 have a generally G-shaped cross-section and are arranged in a parallel, spaced-apart relationship and connected by front K-shaped cross member assembly 120 and rear cross member 160. Front K-shaped cross member assembly 120 includes a base member 121 and a pair of angled cross braces 122. Base member 121 has a generally hat-shaped cross-section with an integrally formed front flange 128, a front vertical wall 125, a top wall 124, a rear vertical wall (not shown), and a rear flange (not shown). Each one of cross braces 122 is connected to and extends between the rear vertical wall of base member 121 and the inboard surface of a respective outboard wall 113 of main member 110. Rear cross member 160 is connected to and extends between outboard walls 113 of main members 110 above and adjacent to rear hangers 126B. Rear cross brace 161 is connected to and extends between main members 110 above and adjacent to a pair of air springs 106 of an axle/suspension system 105. Each one of a pair of locking pin mechanisms 170 is mounted on the front and center portions of prior art subframe 100 for locking the subframe in place on a primary frame (not shown), as is known.

Front and rear pairs of hangers 126A, B, respectively, each depend from a respective one of main members 110. Hangers 126A, B are longitudinally spaced from one another and pivotally mount respective axle/suspension systems 105. Hangers 126A, B each include an inboard wall 130 and an outboard wall 131 which are parallel, spaced apart from one another, and interconnected by a shelf 185 extending between and attached to the walls. Hangers 126A, B are mounted on main member 110 such that inboard wall 130 of each hanger is generally vertically-aligned with and overlaps an inboard wall 114 of the main member, and so that hanger outboard wall 131 is generally vertically-aligned with and overlaps outboard wall 113 of the main member.

Prior art subframe 100 also includes two pairs of hanger supports 199, with each hanger support attached to a respective one of front or rear hangers 126A, B to react side loads from the hangers to base member 121 and cross member 160, respectively. More particularly, hanger support 199 includes an upper end that nests in and is attached to base member 121 of front cross member assembly 120 or to rear cross member 160. The lower ends of hanger supports 199 are rigidly attached to the inboard surface of inboard walls 130 of hangers 126A, B.

Prior art subframe 100 includes front and rear air spring supports 180A, B, respectively, to provide strong support to respective air springs 106. More particularly, front and rear air spring supports 180A, B, respectively, react vertical loads imparted on the air spring from the axle/suspension system during operation of the heavy-duty vehicle.

Certain heavy-duty vehicles utilizing prior art subframe 100, for example, refrigerated trailers and the like, have generally required large, independent, and self-contained power generating or power storage structures, such as for batteries. However, such storage structures generally require additional support or reinforcement integrated into the heavy-duty vehicle, increasing the weight of the heavy-duty vehicle and, thus, decreasing the cargo that can be carried. Moreover, placement of such large self-contained storage structures along the exterior of heavy-duty vehicles may potentially increase the difficulty of balancing the load of the heavy-duty vehicle utilizing prior art subframe 100.

Thus, there is a need in the art for a subframe that includes a battery storage structure that is removeable and relatively lightweight, thereby reducing the cost of materials and manufacturing, provides battery protection, and facilitates quick battery swapping.

Figure 2:
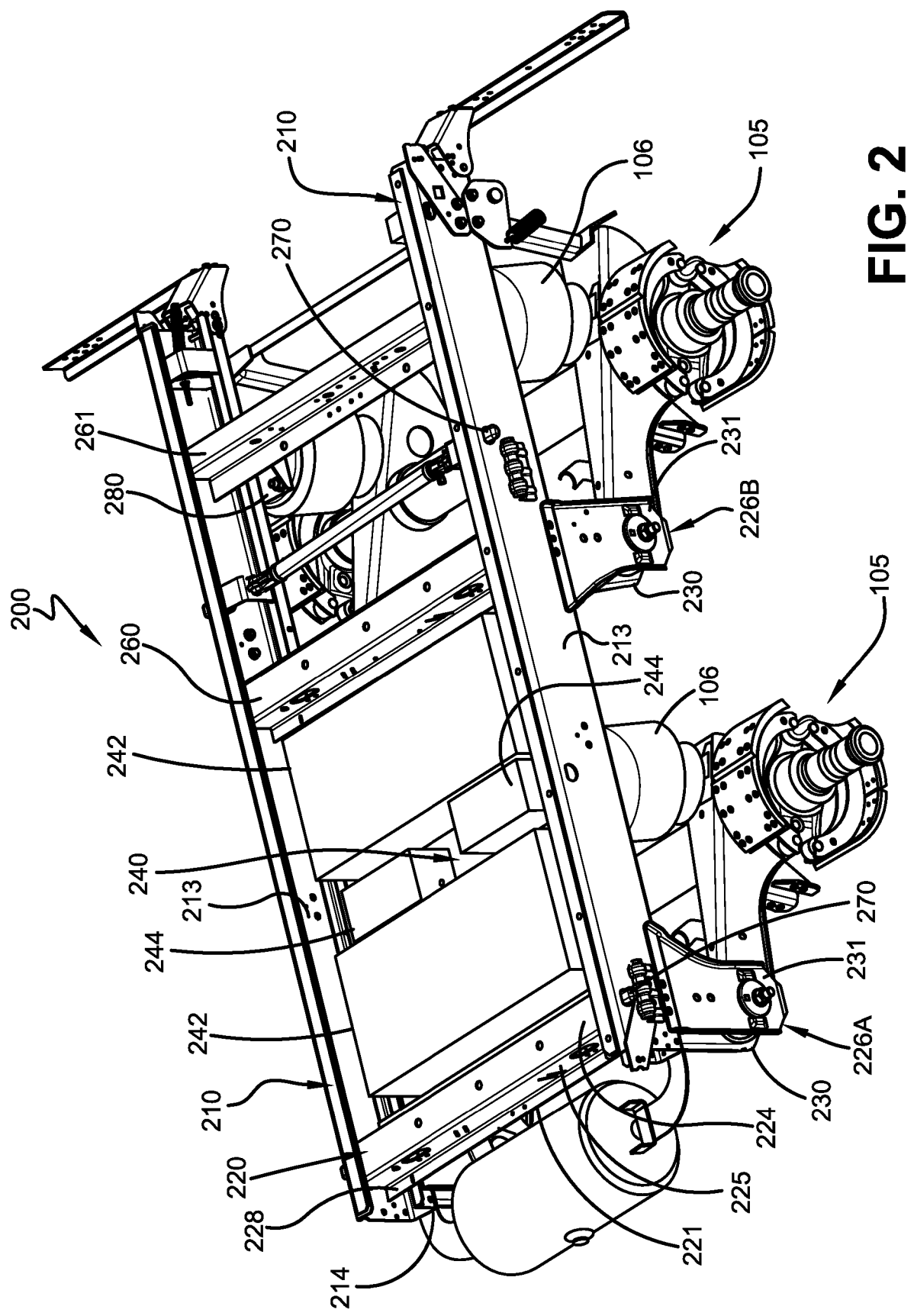
FIG. 2 is a top front perspective view of a first exemplary embodiment subframe, according to the present invention, incorporating a battery storage structure and utilized in conjunction with a pair of axle/suspension systems.
Figure 3:
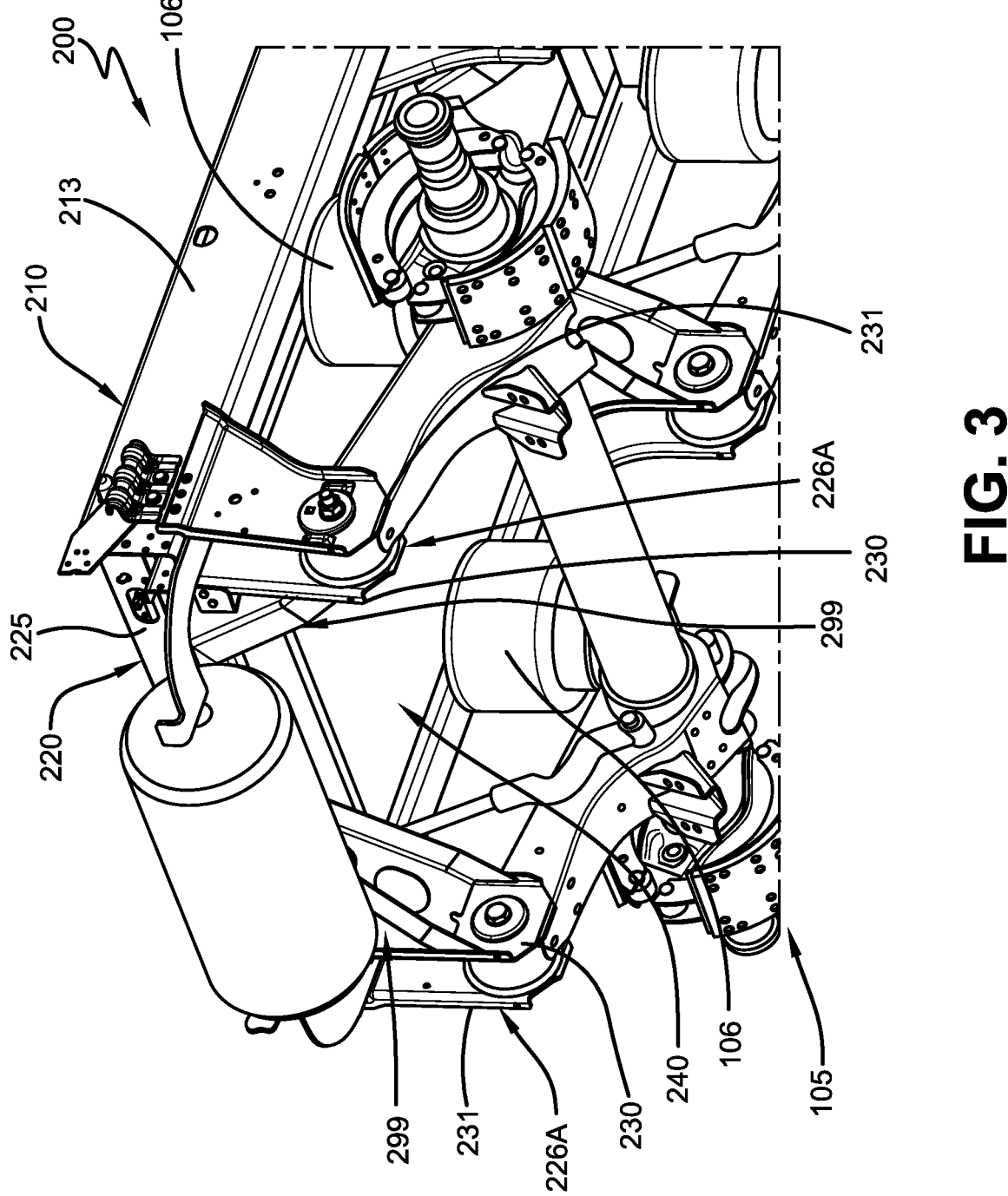
FIG. 3 is a bottom front fragmentary perspective view of the first exemplary embodiment subframe shown in FIG. 2.

A first exemplary embodiment subframe 200 (FIGS. 2-3), according to the present invention, includes a pair of main members 210, a front cross member assembly 220, a rear cross member 260, a rear cross brace 261, and front and rear pairs of hangers 226A, 226B, respectively. Front cross member assembly 220 includes a base member 221 having a generally hat-shaped cross-section with an integrally formed front flange 228, a front vertical wall 225, a top wall 224, a rear vertical wall (not shown), and a rear flange (not shown).

Front and rear pairs of hangers 226A, B, respectively, each depend from a respective one of main members 210. Hangers 226A, B are longitudinally spaced from one another and pivotally mount a respective axle/suspension system, such as axle/suspension system 105. Hangers 226A, B each include an inboard wall 230 and an outboard wall 231 which are parallel, spaced apart from one another, and interconnected by a shelf (not shown) that extends between and is connected to the walls. Hangers 226A, B are mounted on main member 210 such that inboard wall 230 of each hanger is generally vertically-aligned with and overlaps an inboard wall 214 of the main member, and so that hanger outboard wall 231 is generally vertically-aligned with and overlaps an outboard wall 213 of the main member. Rear cross member 260 extends between and is connected to outboard walls 213 of main members 210 above and adjacent to rear hangers 226B. Rear cross brace 261 extends between and is connected to outboard walls 213 of main members 210 above and adjacent to air springs 106 of axle/suspension system 105. Each one of a pair of locking pin mechanisms 270 is mounted on the front and center portions of subframe 200 for locking the subframe in place on a primary frame (not shown), as is known.

Subframe 200 includes two pairs of hanger supports 299 (FIG. 3), with each hanger support attached to a respective one of front or rear hangers 226A, B to react side loads from the hangers to base member 221 and cross member 260. Subframe 200 also includes a pair of rear air spring supports 280 (only one shown) to provide strong support to rear air springs 106. More particularly, air spring supports 280 react vertical loads imparted on air spring 106 from axle/suspension system 105 during operation of the vehicle.

In accordance with an important aspect of the present invention, subframe 200 includes an integrated battery storage structure 240 for housing one or more batteries 242, associated electronics, and/or energy-generating or moderating components, such as a charge controller 244. More particularly, battery storage structure 240 may be removably attached to subframe 200 between main members 210 and front and rear cross members 220,260, respectively, using any suitable means, such as fasteners and the like. It is also contemplated that battery storage structure 240 may be fixedly attached to subframe 200 using any suitable method, such as welding or fasteners. Battery storage structure 240 may be formed as a single rectangular or any other appropriately-shaped pan-like structure from any suitable material, such as steel, using any suitable method, such as fabrication. Alternatively, battery storage structure 240 may be formed from multiple separate pieces and assembled using any suitable method. Moreover, removably attaching battery storage structure 240 to subframe 200 allows for hot-swapping of whole battery storage structures between subframes 200. More particularly, once one or more batteries 242 are depleted, battery storage structure 240 can be removed and a separate battery storage structure with fully charged batteries can be reattached, allowing separate recharging of the batteries, thereby reducing heavy-duty vehicle downtime. It is also contemplated that subframe 200 with battery storage structure 240 could be separated from a heavy-duty vehicle and swapped for another subframe having fully-charged batteries 242 in the battery storage structure.

Figure 4:
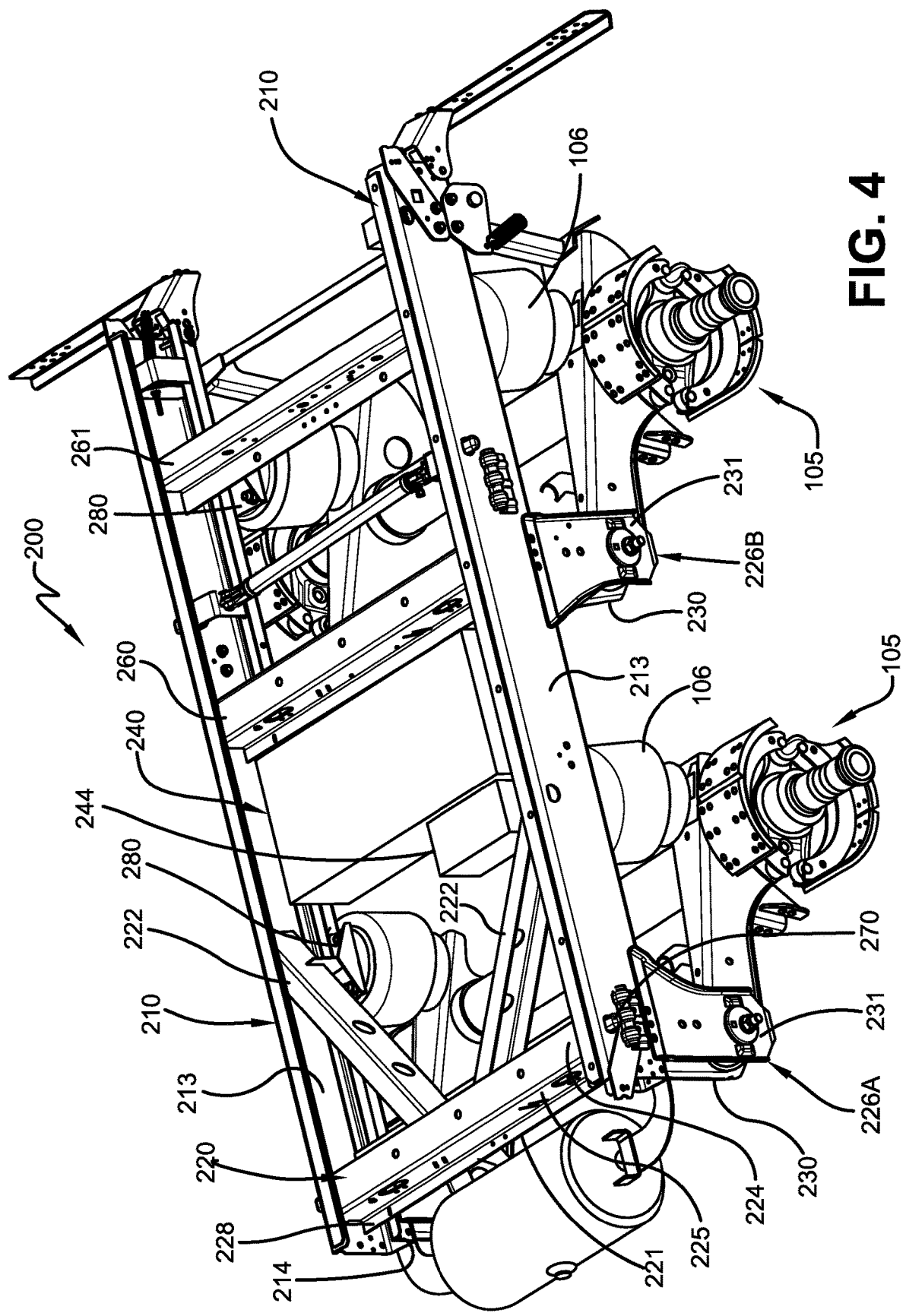
FIG. 4 is a top front perspective view of an alternative arrangement of the first exemplary embodiment subframe shown in FIGS. 2-3, showing an alternative location for the battery storage structure.
Figure 5:
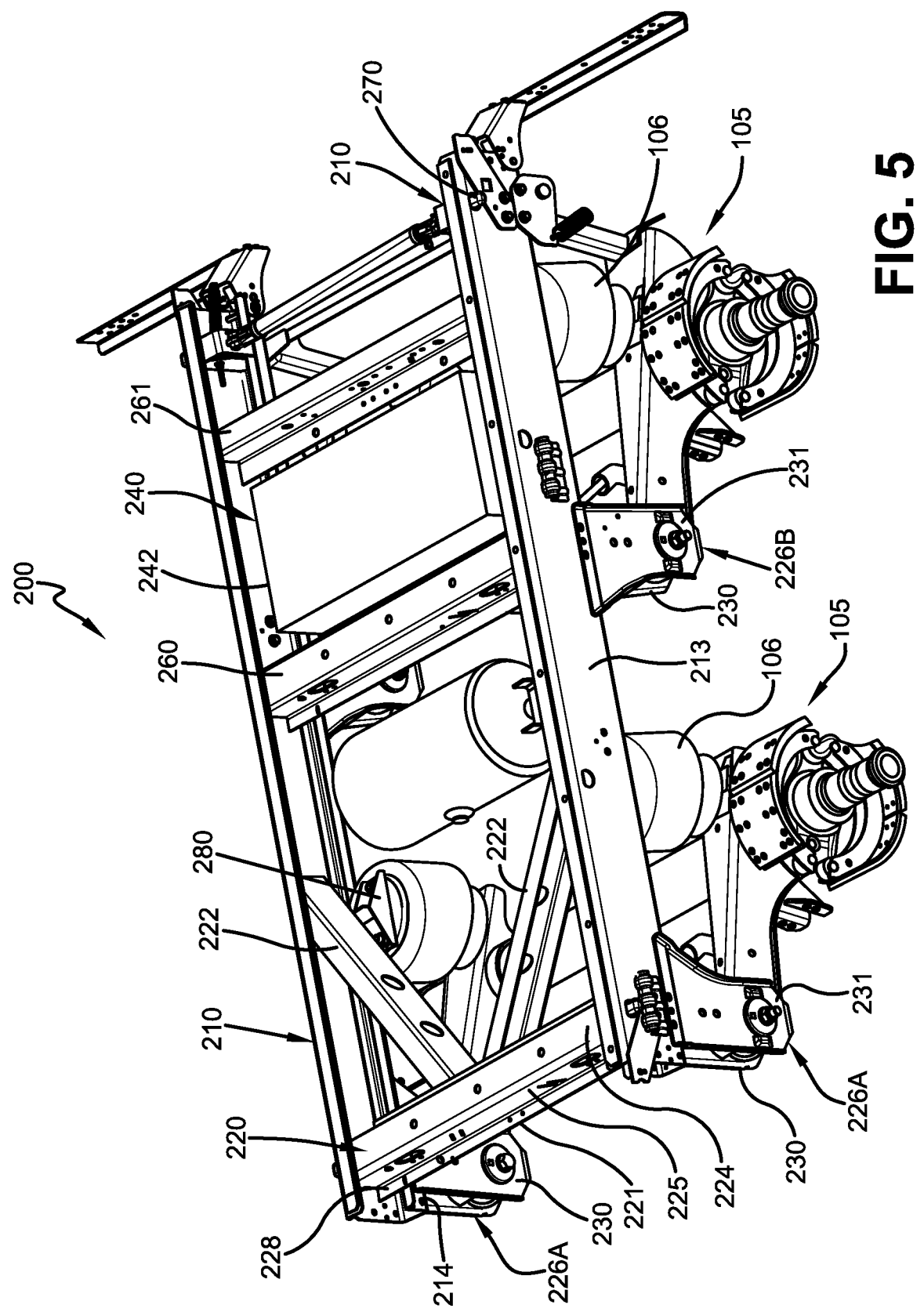
FIG. 5 is a top front perspective view of another alternative arrangement of the first exemplary embodiment subframe shown in FIGS. 2-3, showing another alternative location for the battery storage structure.
Figure 6:
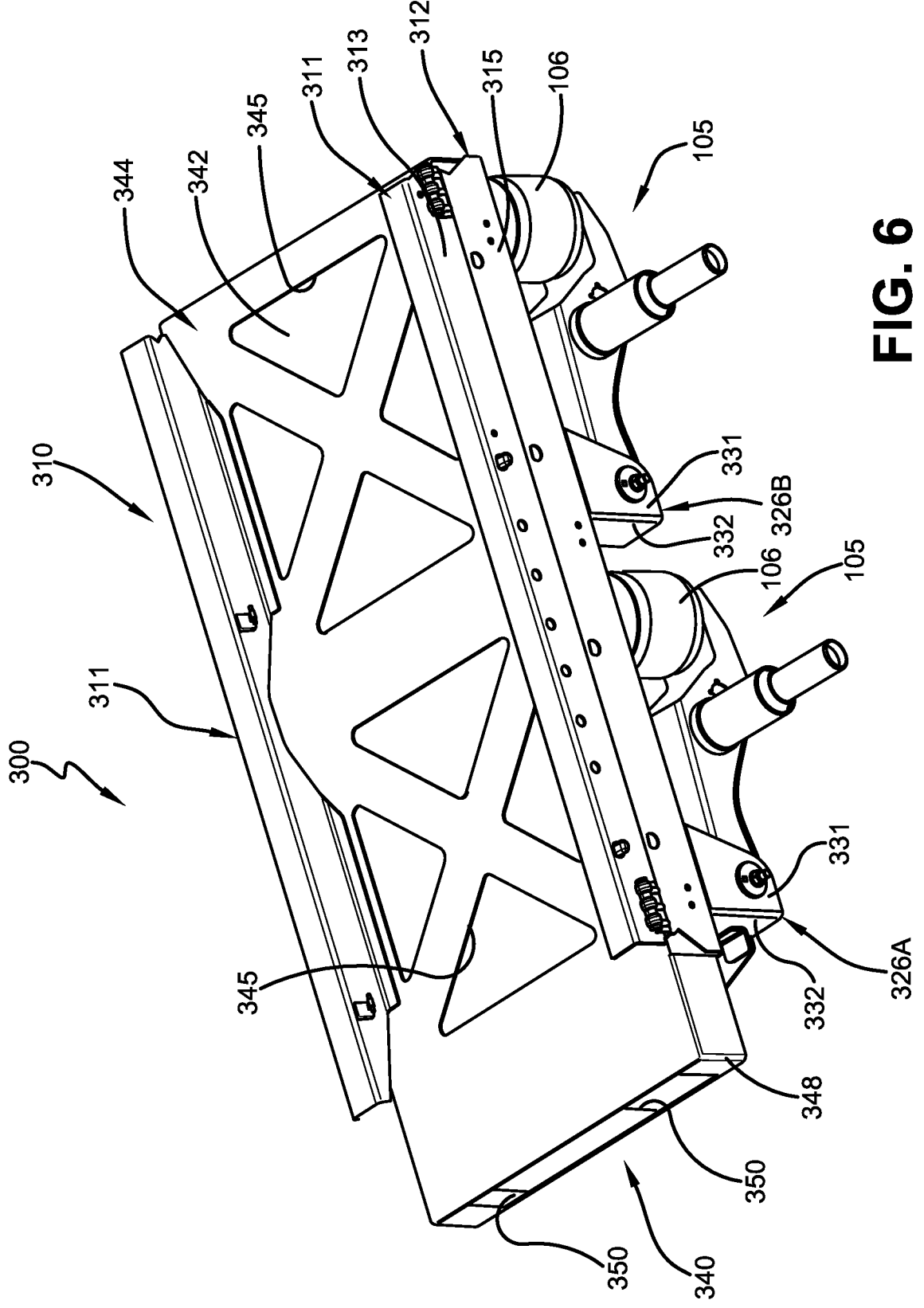
FIG. 6 is a top front perspective view of a second exemplary embodiment subframe, according to the present invention, incorporating an enclosed battery storage structure between the main members and utilized in conjunction with a pair of axle/suspension systems.

It is contemplated that battery storage structure 240 may be located or disposed in alternative locations. More specifically, and with particular reference to FIG. 4, it is contemplated that subframe 200 may utilize a pair of angled cross braces 222 attached to base member 221 to form a K-shaped cross member assembly 220. In such an arrangement, battery storage structure 240 may be removably or fixedly attached between main members 210 and angled cross braces 222. Such a configuration of batter storage structure 240 may also include front air spring supports 280. Alternatively, and with particular reference to FIG. 5, battery storage structure 240 may be removably or fixedly attached between main members 210, rear cross member 260, and rear cross brace 261. It is also contemplated that battery storage structure 240 may replace either one or both of rear cross member 260 and rear cross brace 261, providing the same structural function as the rear cross member and rear cross brace.

Because battery storage structure 240 has a general pan shape, batteries 242, the associated electronics, and/or the energy-generating or moderating components, such as charge controller 244, may be disposed within the battery storage structure such that the batteries and components are protected from road debris, environmental elements, terrain, and/or collisions. Moreover, because battery storage structure 240 is attached to subframe 200 between front and rear cross members 220,260, respectively, and main members 210, the battery storage structure also acts to reinforce the subframe and help react racking or twisting loads imparted on the subframe during operation of the heavy-duty vehicle. It is also contemplated that battery storage structure 240 may act as a strong air spring support for air springs 106 in order to react vertical loads imparted on the air spring from axle/suspension system 105 during operation of the vehicle. Furthermore, integrating battery storage structure 240 with batteries 242 in subframe 200 enables other parts of the heavy-duty vehicle to be lighter and require less reinforcing structure, thereby facilitating weight savings and load balancing of the heavy-duty vehicle.

Thus, first exemplary embodiment subframe 200, according to the present invention, provides battery storage structure 240 that is removeable and relatively lightweight, thereby reducing the cost of materials and manufacturing; protects one or more batteries 242 and associated electronic or energy-generating components, such as charge controller 244; and facilitates quick swapping of the batteries.

A second exemplary embodiment subframe 300 (FIGS. 6-9), according to the present invention, is similar in structure and function to first exemplary embodiment subframe 200, described above. As a result, the description below is directed to the differences in structure and operation between second exemplary embodiment subframe 300, illustrated in FIGS. 6-9, and first exemplary embodiment subframe 200, illustrated in FIGS. 2-5. More specifically, second exemplary embodiment subframe 300 includes a pair of elongated, parallel, spaced-apart main members 310.

Each main member 310 is formed from separate elongated upper and lower beams 311, 312, respectively, vertically aligned and affixed to each other. Upper beam 311 has a generally L- (not shown) or U-shaped cross section with an outboard wall 313. Lower beam 312 has a generally C-shaped cross-section with an outboard wall 315. Upper beam 311 is affixed to lower beam 312 using any suitable means, such as welds or fasteners, such that outboard wall 313 of the upper beam is substantially aligned with outboard wall 315 of the lower beam.

Subframe 300 also includes a front and rear pair of hangers 326A, B, respectively, each depending from main members 310. Hangers 326A, B are longitudinally-spaced from one another and pivotally mount respective axle/suspension systems of any suitable type, such as axle/suspension systems 105. Hangers 326A, B each include an inboard wall 330 and an outboard wall 331 which are parallel, spaced-apart from one another, and interconnected by a front wall 332. Hangers 326A, B are mounted on main member 310 such that outboard wall 331 is generally vertically-aligned with outboard wall 315 of lower beam 312.

In accordance with an important aspect of the present invention, subframe 300 includes an integrated battery storage structure 340. In particular, battery storage structure 340 extends transversely between and is attached to main members 310 of subframe 300. More particularly, battery storage structure 340 may be formed from any suitable material, such as metal, and may include a top plate 344; one or more bottom plates 346; and an end cap 348 that cooperate to form a housing about one or more batteries 342 with integrated components to protect the battery from road debris, environmental elements, terrain, and/or collisions. Moreover, because battery storage structure 340 extends between and is attached to main members 310 of subframe 300, the battery storage structure also acts to reinforce the subframe and reacts loads during operation of the heavy-duty vehicle. Furthermore, integrating battery storage structure 340 in subframe 300 enables other parts of the heavy-duty vehicle to be lighter and require less reinforcing structure, thereby facilitating weight savings and load balancing. It is contemplated that battery 342 may be disposed within battery storage structure 340 and attached to the battery storage structure or main members 310. Alternatively, battery storage structure 340 may include additional elements, such as stop blocks (not shown), to maintain battery 342 within the battery storage structure and prevent shifting of the battery during operation of the heavy-duty vehicle.

Figure 9:
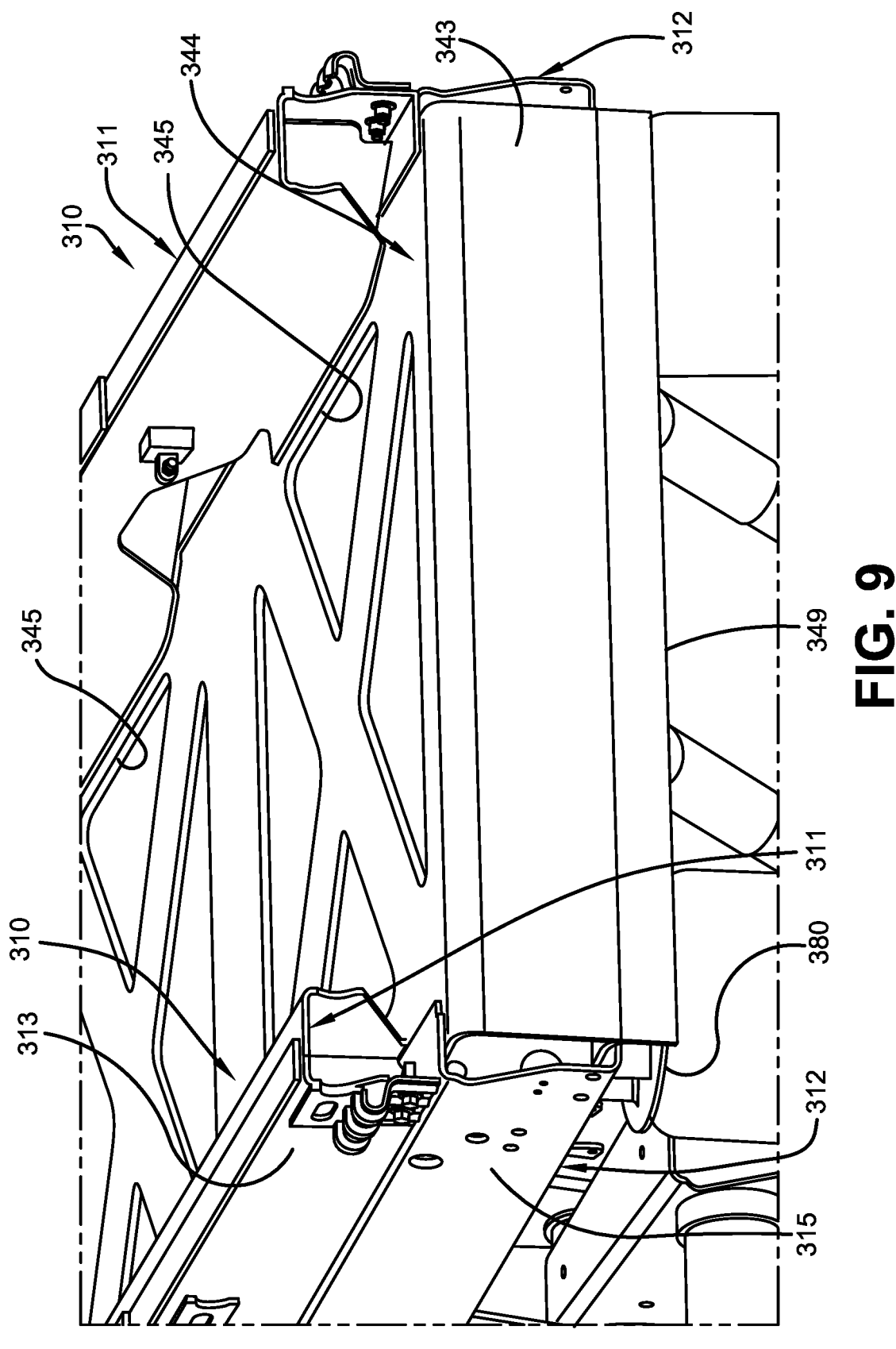
FIG. 9 is a top rear fragmentary perspective view of the second exemplary embodiment subframe shown in FIGS. 6-8.

Top plate 344 extends between and is attached, such as by welding or fasteners, to the respective lower beams 312 of main members 310. Top plate 344 may have one or more openings 345 formed through the top plate to reduce weight and provide ambient cooling for battery 342. Openings 345 may be arranged in any suitable location and/or pattern that may confer additional structural stability to battery storage structure 340. Top plate 344 also includes an integrated, downwardly-extending back plate 343 (FIG. 9). More specifically, back plate 343 may be continuous with and formed from a portion of top plate 344 using any suitable method, such as bending. Alternatively, back plate 343 may be a separate component attached to top plate 344 using any suitable means, such as welds or fasteners.

Bottom plates 346 each extend between and are attached to main members 310 using any suitable means, such as welds or fasteners. In particular, bottom plates, 346 may be generally rectangular plates having respective pairs of cutouts or notches 347. Notches 347 may be any suitable shape, such as square or rectangular, and correspond to at least a portion of the perimeter of front and rear hangers 326A, B, respectively. More particularly, attachment of bottom plates 346 positions notches 347 adjacent respective front and rear hangers 326A, B, respectively, such that the bottom plates may be attached, such as by welding or fasteners, along the notches to the hangers, as best shown in FIG. 7.

Figure 7:
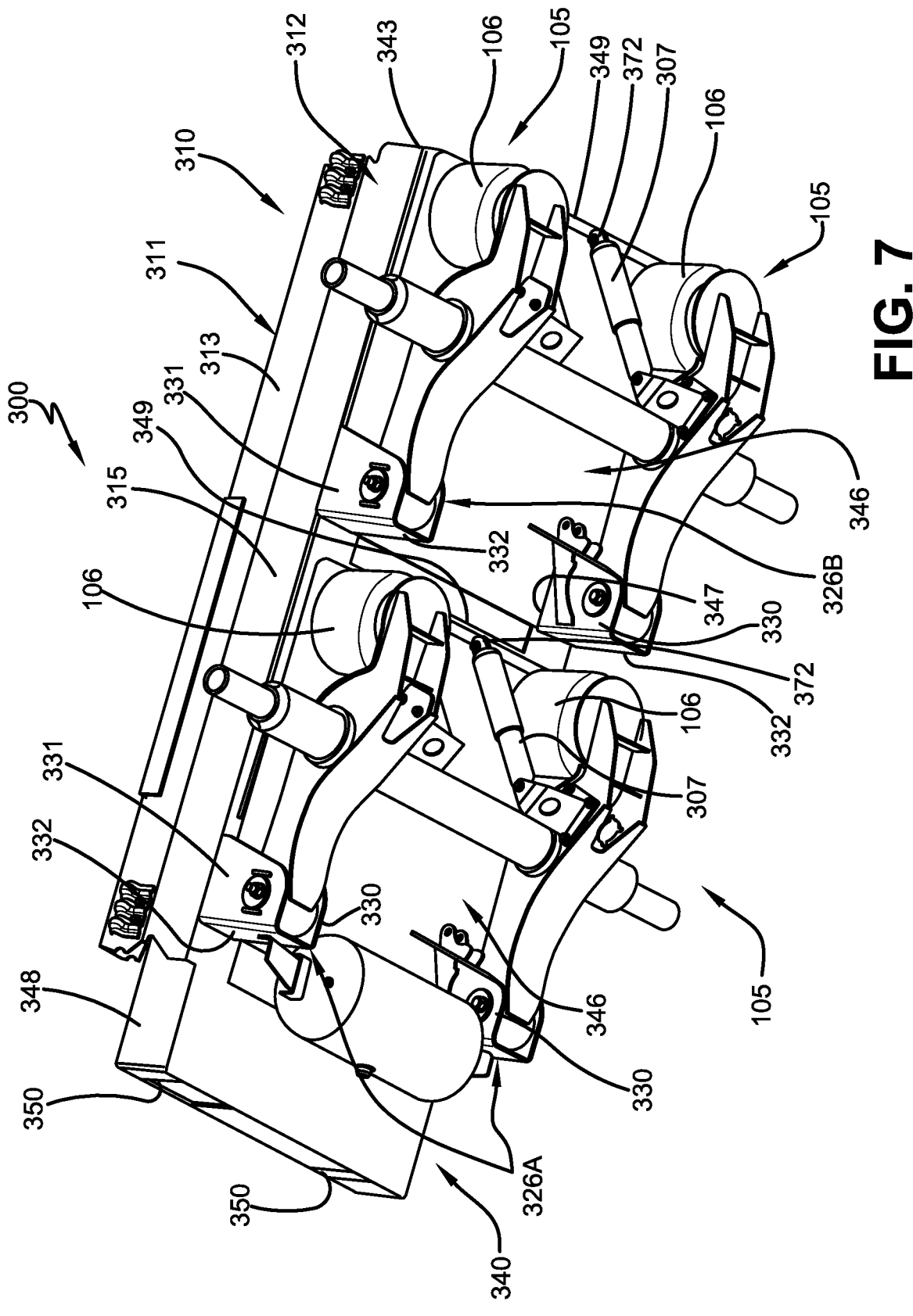
FIG. 7 is a bottom front perspective view of the second exemplary embodiment subframe shown in FIG. 6.
Figure 8:
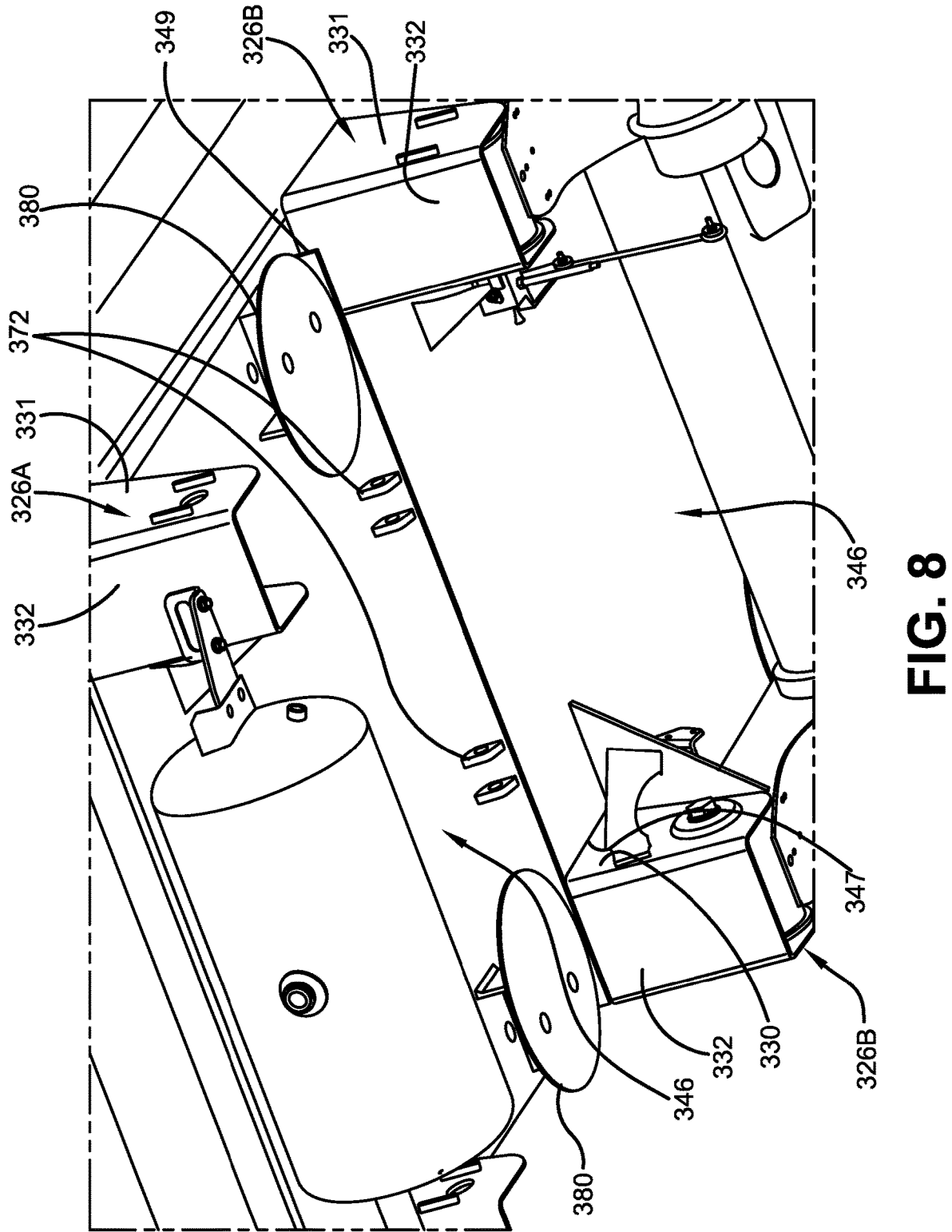
FIG. 8 is an enlarged bottom front fragmentary perspective view of the second exemplary embodiment subframe shown in FIGS. 6-7 with certain components of the axle/suspension systems removed.

In accordance with another important aspect of the present invention, each of bottom plates 346 may be formed with a downwardly-extending arcuate or curled edge 349 (FIGS. 7-8). Edge 349 provides additional rigidity to bottom plates 346 to react forces during operation of the heavy-duty vehicle. In addition, edge 349 also provides structure for the attachment of a pair of brackets 372 using any suitable method, such as welding or fasteners, to each of the bottom plates. More specifically, brackets 372 may be formed as a single component or as separate components, such as a pair of transversely-spaced plates, having a profile that conforms to the arcuate shape or curl of edge 349. Brackets 372 may be located along edge 349 inboardly of main members 310 and attached between the edge and bottom surface of bottom plates 346A, B. Each of brackets 372 may receive and be removably attached to, such as by fasteners, an upper mount of a shock absorber 307 of axle/suspension system 105. It is also contemplated that edge 349 of bottom plate 346 may be in contact with or attached to, such as by welds or fasteners, back plate 343.

Bottom plates 346 may also include a pair of air spring supports 380, as best seen in FIG. 8. In particular, each pair of air spring supports 380 is attached using any suitable means, such as welds or fasteners, to the respective bottom plate 346 at locations vertically aligned with main members 310. More particularly, a portion of each air spring support 380 is aligned with and removably connected to one of air springs 106 of axle/suspension system 105.

In accordance with yet another important aspect of the present invention, battery storage structure 340 includes end cap 348. End cap 348 may be any suitable material, such as metal, and fabricated from multiple components or formed as a single piece using any suitable method, such as rolling or bending. In particular, end cap 348 may extend between and be attached to top plate 344 and one of bottom plates 346. More particularly, end cap 348 may be formed from sheet metal as a generally elongated U-shaped structure that extends between the front of top plate 344 and one of bottom plates 346 and is attached to the top plate and bottom plate using any suitable means, such as welds or fasteners. As a result, end cap 348 may ensure battery 342 is protected and prevent shifting of the battery during operation of the heavy-duty vehicle. It is contemplated that in such a configuration, once battery 342 is depleted, subframe 300 with battery storage structure 340 could be separated from the heavy-duty vehicle and swapped for another subframe with fully-charged battery. Alternatively, end cap 348 may be removably attached to top plate 344 and one of the bottom plates 346 using any suitable means, such as fasteners. In such an arrangement, end cap 348 would provide access to battery 342 allowing removal of the battery from subframe 300. Rendering battery 342 removable allows for hot-swapping of the battery within subframe 300. More particularly, once battery 342 is depleted, end cap 348 of battery storage structure 340 can be removed along with the battery and a separate, fully-charged battery can be installed, allowing separate recharging of the batteries, thereby reducing heavy-duty vehicle downtime.

End cap 348 also includes one or more openings 350. Openings 350 may be formed through end cap 348 and have any suitable size and/or shape, such as rectangular. Openings 350 may provide access to battery 342 or other components attached or integrated into the battery. In addition, openings 350 may allow for the passage of cabling or hoses for accessory systems associated with battery 342, such as data, power transfer, cooling, and the like.

Thus, second exemplary subframe 300, according to the present invention, provides robust battery storage structure 340 that is relatively lightweight, thereby reducing the cost of materials and manufacturing; protects battery 342; and facilitates quick swapping of the battery.

Figure 10:
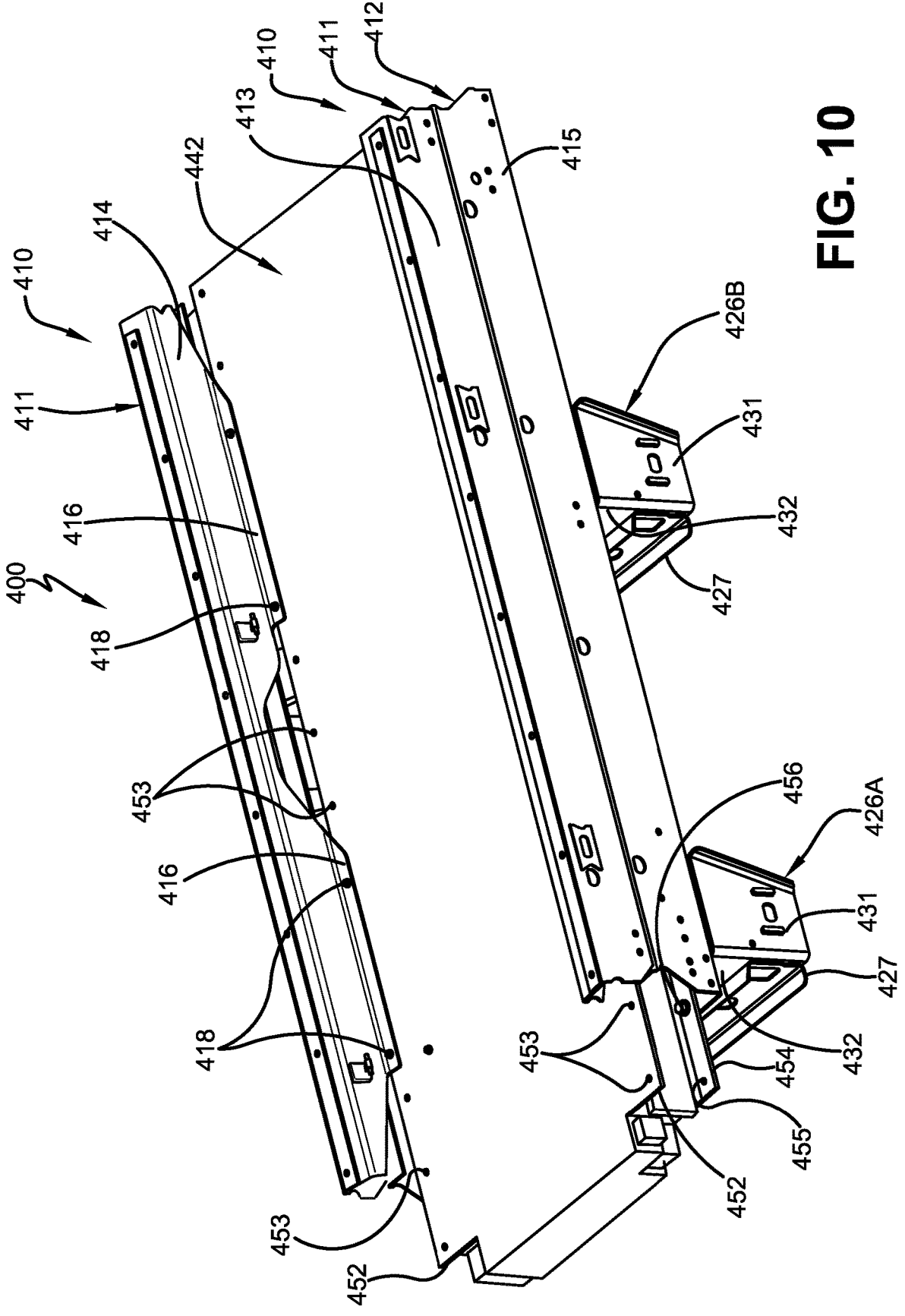
FIG. 10 is a top front perspective view of a third exemplary embodiment subframe, according to the present invention, incorporating a battery without storage structure between the main members.

A third exemplary embodiment subframe 400 (FIGS. 10-11), according to the present invention, is similar to first and second exemplary embodiment subframes 200, 300, respectively, described above. As a result, the description below is directed to the differences in structure and operation between third exemplary embodiment subframe 400, illustrated in FIGS. 10-11, and first and second exemplary embodiment subframes 200, 300 illustrated in FIGS. 2-5 and 6-9, respectively. More specifically, third exemplary embodiment subframe 400 includes a pair of elongated, parallel, spaced-apart main members 410.

Figure 11:
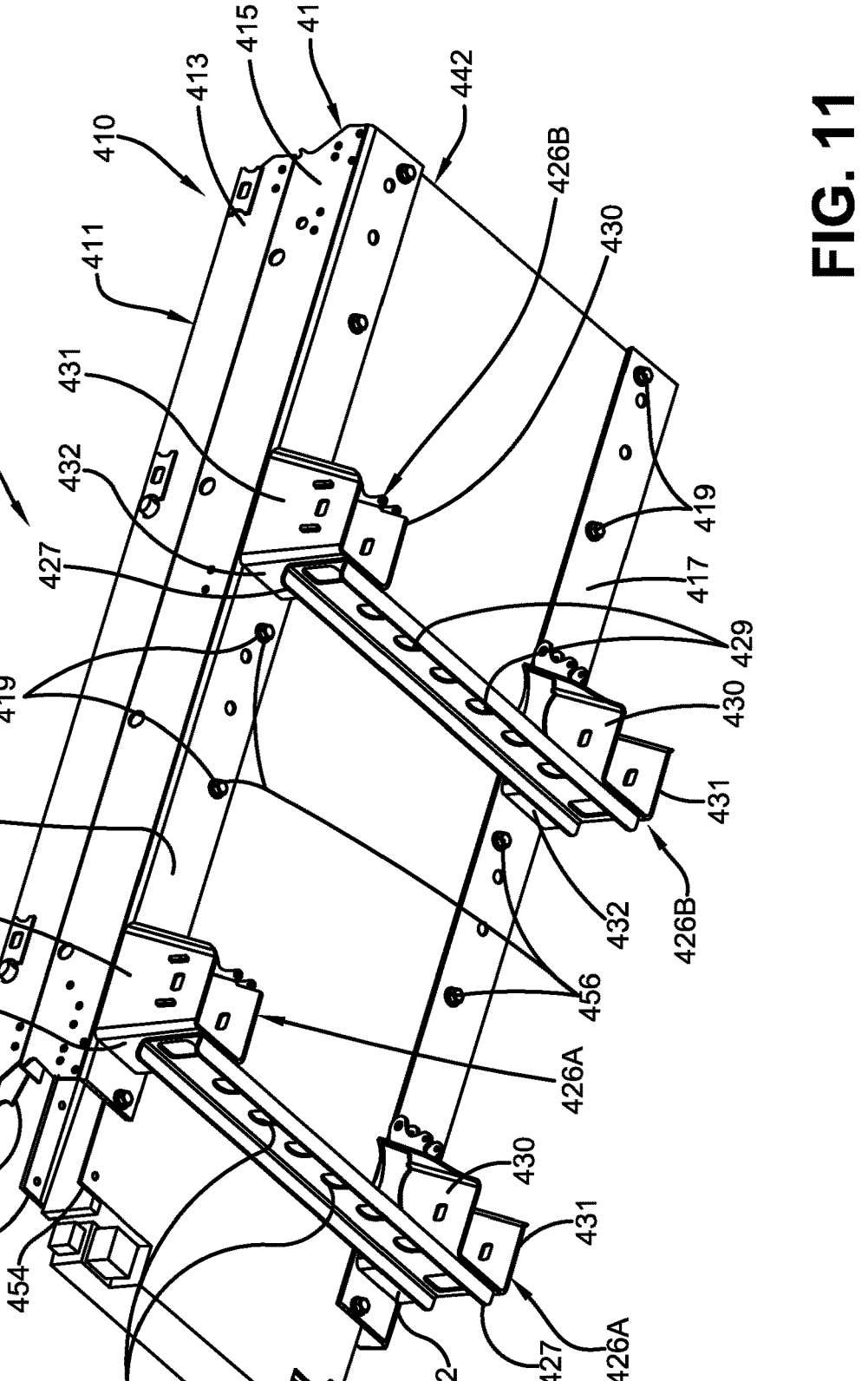
FIG. 11 is a bottom front perspective view of the third exemplary embodiment subframe shown in FIG. 10.

Each main member 410 is formed from separate elongated upper and lower beams 411, 412, respectively, vertically aligned and affixed to each other. Upper beam 411 has a generally U-shaped cross section with an outboard wall 413 and inboard wall 414. Inboard wall 414 may be formed with a flange 416 extending transversely inboard from the inboard wall. Flange 416 is formed with a plurality of longitudinally-spaced openings 418. Lower beam 412 has a generally C-shaped cross-section with an outboard wall 415 and a bottom wall 417 (FIG. 11). Bottom wall 417 is formed with a plurality of longitudinally-spaced openings 419. Upper beam 411 is affixed to lower beam 412 using any suitable means, such as welds or fasteners, such that outboard wall 413 of the upper beam is substantially aligned with outboard wall 415 of the lower beam.

Subframe 400 also includes a front and rear pair of hangers 426A, B, respectively, each depending from main members 410. Hangers 426A, B are longitudinally-spaced from one another and pivotally mount respective axle/suspension systems (not shown) of any suitable type. Hangers 426A, B each include an inboard wall 430 and an outboard wall 431 which are parallel, spaced-apart from one another, and interconnected by a front wall 432. Hangers 426A, B are mounted on main member 410 such that outboard wall 431 is generally vertically-aligned with outboard wall 415 of lower beam 412.

In accordance with an important aspect of the present invention, subframe 400 includes a battery 442 with integrated management components. Battery 442 extends between and is directly attached, such as by fasteners, to main members 410 of subframe 400. In particular, battery 442 has integrated protective structure that protects the battery from road debris, environmental elements, terrain, and/or collisions and allows for direct attachment of the battery to main members 410. More particularly, battery 442 includes a pair of longitudinal upper flanges 452 and a pair of longitudinal lower flanges 454 extending transversely-outward in opposite directions from the battery. Upper flanges 452 may be formed with a plurality of longitudinally-spaced openings 453. Openings 453 are generally aligned with respective openings 418 formed through flanges 416 of inboard walls 414 of upper beams 411 of main members 410. Similarly, lower flanges 454 are formed with a plurality of longitudinally-spaced openings 455. Openings 455 are generally aligned with respective openings 419 formed through bottom walls 417 of lower beams 412 of main members 410. Aligned openings 453, 418 and aligned openings 455, 419 may receive respective suitable fasteners 456 to removably attach battery 442 to main members 410. Because battery 442 extends between and is attached to main members 410 of subframe 400, the battery acts to reinforce the subframe and reacts loads during operation of the heavy-duty vehicle. Moreover, integrating battery 442 into subframe 400 enables other parts of the heavy-duty vehicle to be lighter and require less reinforcing structure, thereby facilitating weight savings and load balancing.

In accordance with another important aspect of the present invention, subframe 400 also includes a pair of hanger supports or crossmembers 427 reinforcing and connecting the pairs of front and rear hangers 426A, B, respectively. More specifically, crossmember 427 may be a C-shaped beam extending between and attached to front walls 432 of front hangers 426A and rear hangers 426B. As a result, crossmembers 427 provide additional support structure to subframe 400 to react loads during heavy-duty vehicle operation. Crossmembers 427 may be formed with a plurality of openings 429 having any suitable size and shape, such as circular. Openings 429 may provide crossmembers 427 with reduced weight and wind resistance and may be used to route conduits, wiring, and the like.

It is contemplated that, once battery 442 is depleted, subframe 400 could be separated from the heavy-duty vehicle and swapped for another subframe with fully-charged battery. Alternatively, under certain conditions, such as end of service-life, battery 442 may be removed from subframe 400. Rendering battery 442 removable allows for hot-swapping of the battery within subframe 400. More particularly, once battery 442 is depleted or reaches end of service-life, the battery can be detached from main members 410 and a separate, fully-charged and/or new battery can be installed, thereby reducing heavy-duty vehicle downtime.

Thus, third exemplary embodiment subframe 400, according to the present invention, provides robust structure for integrating battery 442 that is relatively lightweight, thereby reducing the cost of materials and manufacturing; protects the battery; and facilitates quick swapping of the battery.

Figure 12:
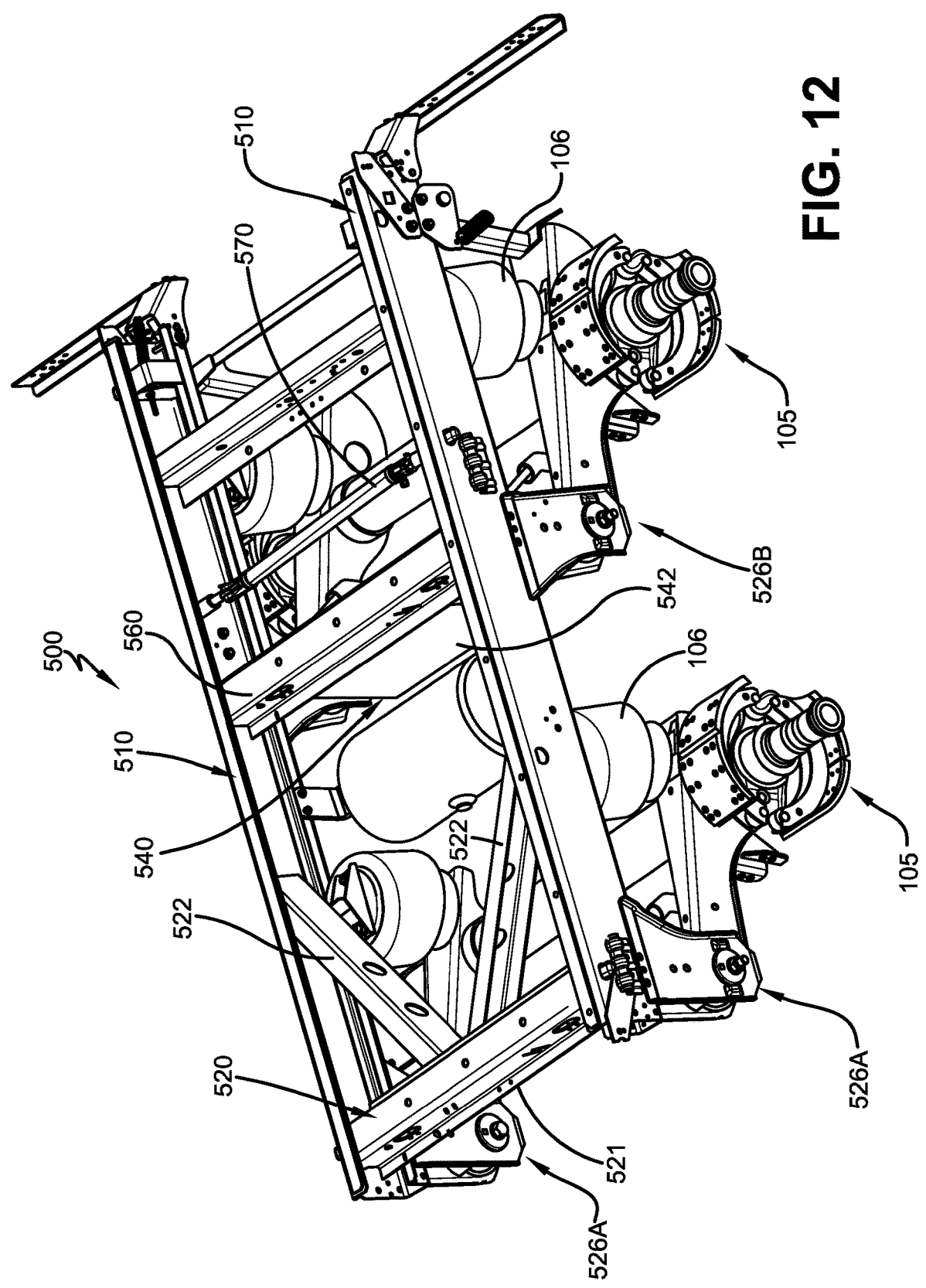
FIG. 12 is top front perspective view of a fourth exemplary embodiment subframe, according to the present invention, incorporating a battery storage structure between the rear pair of hangers and utilized in conjunction with a pair of axle/suspension systems.

A fourth exemplary embodiment subframe 500 (FIGS. 12-14), according to the present invention, is similar in structure and function to first, second, and third exemplary embodiment subframes 200, 300, 400, respectively, described above. As a result, the description below is directed to the differences in structure and operation between fourth exemplary embodiment subframe 500, illustrated in FIGS. 12-14, and first, second, and third exemplary embodiment subframes 200, 300, 400, illustrated in FIGS. 2-5, 6-9, and 10-11, respectively. More specifically, fourth exemplary embodiment subframe 500 includes a front K-shaped cross member assembly 520 having a base member 521, a pair of angled cross members 522, and a rear cross member 560 extending between and attached to a transversely spaced pair of elongated main members 510. A pair of front and rear hangers 526A, B, respectively, are longitudinally-spaced from one another and depend from main members 510.

Figure 13:
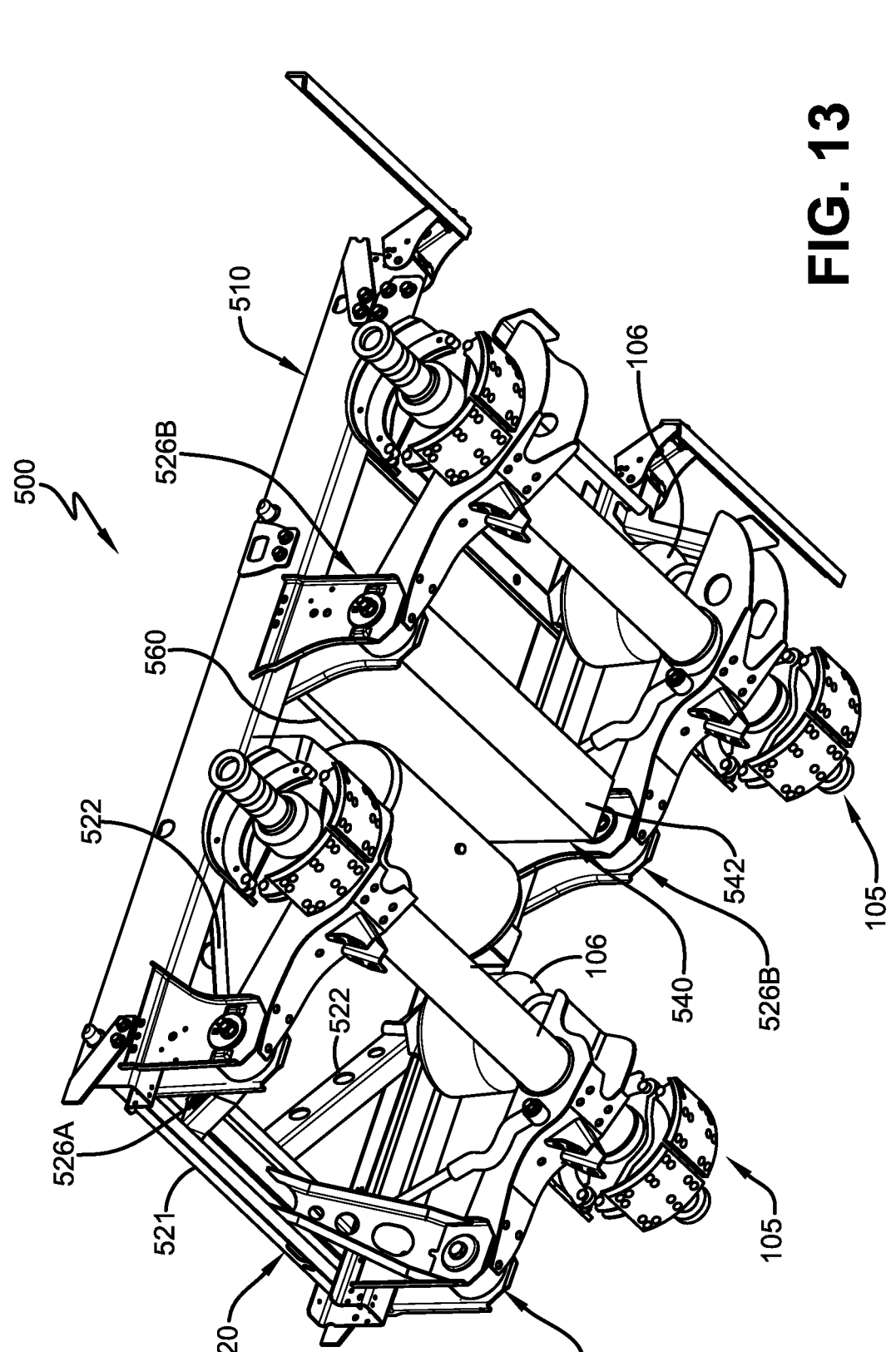
FIG. 13 is a bottom front perspective view of the fourth exemplary embodiment subframe shown in FIG. 12.
Figure 14:
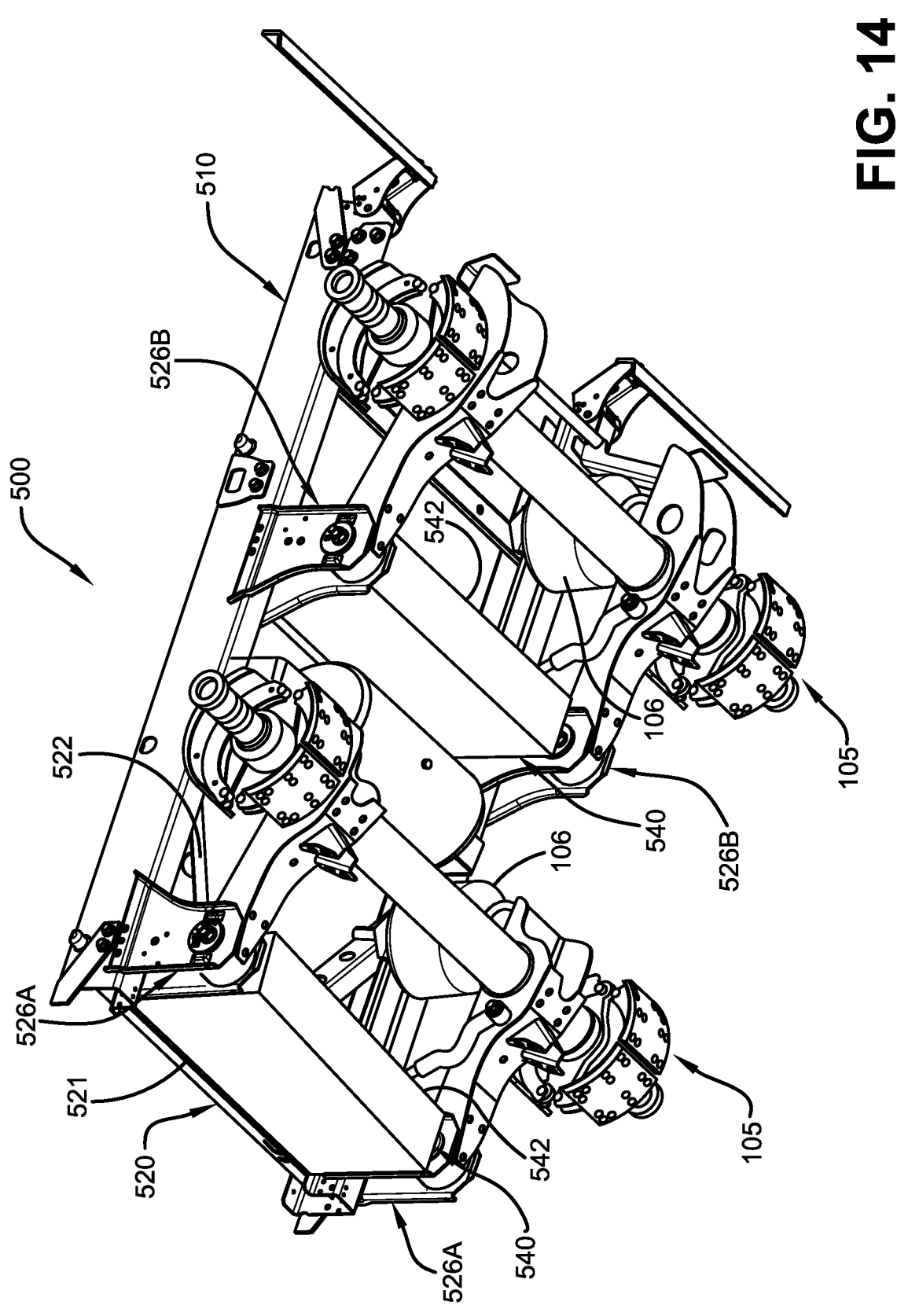
FIG. 14 is a bottom front perspective view of an alternative arrangement of the fourth exemplary embodiment subframe shown in FIGS. 12-13, incorporating a pair of battery storage structures between the front and rear pairs of hangers.

In accordance with an important aspect of the present invention, subframe 500 includes one or more integrated battery storage structures 540. In particular, battery storage structure 540 is removably attached to subframe 500. More particularly, battery storage structure 540 extends transversely between and is removably attached to one or both pairs of front and rear hangers 526A, B, respectively, using any suitable means, such as fasteners, and is thus disposed beneath the respective front cross member assembly 520 or rear cross member 560, as shown in FIGS. 13-14. Battery storage structure 540 may be formed as a single rectangular or any other appropriately-shaped structure from any suitable material using any suitable method, such as fabrication, to form a cradle or housing for one or more batteries 542, associated electronics, and/or energy generating components. Alternatively, battery storage structure 540 may be formed from multiple separate pieces and assembled using any suitable method, such as welding or fasteners. It is also contemplated that battery storage structure 540 may be fixedly attached to subframe 500 using any suitable method, such as welding or fasteners. Removably attaching battery storage structure 540 to subframe 500 allows for hot-swapping of whole battery storage structures between subframes. More particularly, once batteries 542 are depleted, battery storage structure 540 can be removed and a separate battery storage structure with fully charged batteries can be reattached, allowing separate recharging of the batteries, thereby reducing heavy-duty vehicle downtime. It is also contemplated that subframe 500 with battery storage structure 540 could be separated from a heavy-duty vehicle and swapped for another subframe having fully charged batteries 542 in the battery storage structure.

Battery storage structure 540 forms a cradle about batteries 542, associated electronics, and/or energy-generating components to protect the batteries and other components from road debris environmental elements, terrain, and/or collisions. Moreover, because battery storage structure 540 is attached to subframe 500 between one or both of the front and rear cross hangers 526A, B, respectively, the battery storage structure also acts to reinforce the subframe and reacts side loads from the hangers to the respective base member 521 or cross member 560 during operation of the heavy-duty vehicle. Furthermore, integrating battery storage structure 540 in subframe 500 enables other parts of the heavy-duty vehicle to be lighter and require less reinforcing structure, thereby facilitating weight savings and load balancing.

Thus, subframe 500, according to the present invention, provides battery storage structure 540 that is removeable and relatively lightweight, thereby reducing the cost of materials and manufacturing; protects one or more batteries 542 and associated electronic or energy-generating components; and facilitates quick swapping of the batteries.

It is to be understood that the structure and operation of subframes 200, 300, 400, 500, according to the present invention, may be altered or rearranged, or certain components omitted or added, without affecting the overall concept or operation of the present invention. It is contemplated that battery storage structures 240, 340, 540 could be formed from any suitable material, including but not limited to composites, metal, and the like, without changing the overall concept or operation of the present invention. It is also contemplated that battery storage structures 240, 340, 540 could be utilized with any battery type and/or battery system known to those in the art. It is further contemplated that battery storage structure 240, 340, 540 could be utilized with all types of frames, including primary frames and moveable and non-moveable subframes, without changing the overall concept or operation of the present invention.

It is contemplated that subframes 200, 300, 400, 500 could be utilized with all types of heavy-duty vehicles, including trucks, tractor-trailers and semi-trailers, trailers, and the like having one or more than one axle, without changing the overall concept or operation of the present invention. It is also contemplated that subframe 200, 300, 400, 500 could be utilized in conjunction with all types of mechanical spring and air-ride beam-type axle/suspension system designs known to those skilled in the art, such as overslung/top-mount or underslung/bottom-mount, spring-beam, non-torque-reactive, independent, and four-bag axle/suspension systems, including axle/suspension systems using U-bolts, U-bolt brackets/axle seats, and the like, or other types of suspensions without changing the overall concept or operation of the present invention.

Accordingly, the subframes 200, 300, 400, 500, according to the present invention, are simplified; combine the functions of a slider, battery storage, and battery protection; provide an effective, safe, inexpensive, and efficient structure and method, which achieve all the enumerated objectives; provides for eliminating difficulties encountered with prior art subframes, and solves problems and obtains new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed. Moreover, the description and illustration of the invention is by way of example, and the scope of the invention is not limited to the exact details shown or described.

Having now described the features, discoveries and principles of the invention, the manner in which the subframes are used and installed; the characteristics of the construction, arrangement, and method steps; and the advantageous, new, and useful results obtained, the new and useful structures, devices, elements, arrangements, process, parts, and combinations are set forth in the appended claims.

What is claimed is:

1. A subframe for heavy-duty vehicles, said subframe comprising:
    a pair of elongated, longitudinal main members;
    at least one pair of hangers, each hanger of said at least one pair of hangers being attached to a respective one of said main members; and
    a battery storage structure directly attached to the main members of and integrated into said subframe;
    wherein said battery storage structure reinforces the subframe and reacts loads during operation of the heavy-duty vehicle.

2. The subframe for heavy-duty vehicles of claim 1, said battery storage structure further comprising:
    a battery; and
    a pan-like structure extending between and attached to said main members, said battery being disposed adjacent said pan-like structure.

3. The subframe for heavy-duty vehicles of claim 2, said pan-like structure being removably attached to said main members to enable said battery storage structure to be hot-swappable.

4. The subframe for heavy-duty vehicles of claim 1, said battery storage structure further comprising a reinforced battery, said battery extending between and being attached directly to said main members.

5. The subframe for heavy-duty vehicles of claim 1, said battery storage structure further comprising:
    a top plate extending between and attached to said main members;
    at least one bottom plate spaced a vertical distance from said top plate and extending between and attached to said main members; and a battery disposed between the top plate and said at least one bottom plate.

6. The subframe for heavy-duty vehicles of claim 5, said at least one bottom plate further comprising a downwardly-extending, arcuate flange.

7. The subframe for heavy-duty vehicles of claim 6, said top plate further comprising an integrally-formed, downwardly-extending back plate.

8. The subframe for heavy-duty vehicles of claim 7, wherein a plane of said back plate is substantially parallel and adjacent to a plane of said flange of said at least one bottom plate.

9. The subframe for heavy-duty vehicles of claim 6, said flange including at least one bracket for connecting a component of an axle/suspension system, said bracket being attached between said flange and the bottom surface of said bottom plate.

10. The subframe for heavy-duty vehicles of claim 5, said battery storage structure further comprising:

an end cap extending between and attached to said top plate and said at least one bottom plate.

11. The subframe for heavy-duty vehicles of claim 10, said end cap being formed with at least one opening.

12. The subframe for heavy-duty vehicles of claim 5, said battery being removably attached to said main members.

13. The subframe for heavy-duty vehicles of claim 1, said battery storage structure extending between and being attached to said at least one pair of hangers.

14. The subframe for heavy-duty vehicles of claim 13, said battery storage structure further comprising a rectangular cradle for housing a battery;

wherein a battery is disposed within said cradle.

15. A subframe for heavy-duty vehicles, said subframe comprising:

a pair of elongated, longitudinal main members;

at least one pair of hangers, each hanger of said at least one pair of hangers being attached to a respective one of said main members; and a battery storage structure integrated into said subframe, said battery storage structure including:

a top plate extending between and attached to said main members;

at least one bottom plate spaced a vertical distance from said top plate and extending between and attached to said main members, said at least one bottom plate including a downwardly-extending, arcuate flange; and a battery disposed between the top plate and the at least one bottom plate.

16. The subframe for heavy-duty vehicles of claim 15, said top plate further comprising an integrally-formed, downwardly-extending back plate.

17. The subframe for heavy-duty vehicles of claim 16, wherein a plane of said back plate is substantially parallel and adjacent to a plane of said flange of said at least one bottom plate.

18. The subframe for heavy-duty vehicles of claim 15, said flange including at least one bracket for connecting a component of an axle/suspension system, said bracket being attached between said flange and the bottom surface of said bottom plate.

19. The subframe for heavy-duty vehicles of claim 15, said battery storage structure further comprising:

an end cap extending between and attached to said top plate and said at least one bottom plate.

20. The subframe for heavy-duty vehicles of claim 19, said end cap being formed with at least one opening.

21. The subframe for heavy-duty vehicles of claim 15, said battery being removably attached to said main members.

* * * * *